United States Patent
Kawabe et al.

(10) Patent No.: US 9,574,513 B2
(45) Date of Patent: Feb. 21, 2017

(54) CONTROL UNIT FOR INTERNAL COMBUSTION ENGINE

(71) Applicant: MITSUBISHI JIDOSHA KOGYO KABUSHIKI KAISHA, Tokyo (JP)

(72) Inventors: Takashi Kawabe, Tokyo (JP); Fumiaki Hiraishi, Tokyo (JP)

(73) Assignee: Mitsubishi Jisdosha Kogyo Kabushiki Kaisha, Tokyo (JP)

( * ) Notice: Subject to any disclaimer, the term of this patent is extended or adjusted under 35 U.S.C. 154(b) by 162 days.

(21) Appl. No.: 14/240,791

(22) PCT Filed: Oct. 23, 2012

(86) PCT No.: PCT/JP2012/077318
§ 371 (c)(1),
(2) Date: Feb. 25, 2014

(87) PCT Pub. No.: WO2013/073345
PCT Pub. Date: May 23, 2013

(65) Prior Publication Data
US 2014/0230792 A1    Aug. 21, 2014

(30) Foreign Application Priority Data
Nov. 18, 2011 (JP) .................... 2011-253046

(51) Int. Cl.
*F02D 41/30* (2006.01)
*F02D 41/34* (2006.01)
(Continued)

(52) U.S. Cl.
CPC .......... *F02D 41/30* (2013.01); *F02D 13/0261* (2013.01); *F02D 41/3094* (2013.01); *F02D 41/34* (2013.01);
(Continued)

(58) Field of Classification Search
CPC .......... F02D 13/02; F02D 41/04; F02D 41/30; F02D 41/34; F02D 43/00; F02M 63/00
(Continued)

(56) References Cited

U.S. PATENT DOCUMENTS 5,133,310 A * 7/1992 Hitomi ................ F01L 1/34406
123/90.15
6,173,704 B1 * 1/2001 Komoriya .......... B01D 53/8696
123/568.21
(Continued)

FOREIGN PATENT DOCUMENTS

CN    101171411 A    4/2008
EP    1 905 988 A2    4/2008
(Continued)

OTHER PUBLICATIONS

JP 2005-201113 English Translation Version.*
JP 2008-101540 English Translation Version.*

*Primary Examiner* — John Kwon
*Assistant Examiner* — Johnny H Hoang
(74) *Attorney, Agent, or Firm* — Birch, Stewart, Kolasch & Birch, LLP

(57) ABSTRACT

Provided is a control unit (1) for an internal combustion engine (10) including a direct injector (11) directly injecting fuel into a cylinder (20) and a port injector (12) injecting fuel into an intake port (17). The control unit (1) includes an injection volume calculator (5) to calculate a volume of the fuel injected from the direct injector (11), a port injection controller (2) to control a volume of the fuel injected from the port injector (12), an overlap period controller (4) to control an overlap period during which both an intake valve (27) and an exhaust valve (28) are open, and a changer (6) to vary both the volume of the port injection from the port injector (12) and the overlap period based on the volume of the direct injection.

9 Claims, 3 Drawing Sheets

(51) Int. Cl.
*F02D 43/04* (2006.01)
*F02D 13/02* (2006.01)
*F02D 41/04* (2006.01)

(52) U.S. Cl.
CPC ............... *F02D 43/04* (2013.01); *F02D 41/04* (2013.01); *Y02T 10/18* (2013.01); *Y02T 10/44* (2013.01)

(58) Field of Classification Search
USPC ...... 701/103–105; 123/90.15, 299, 300, 478, 123/480, 490, 672, 675, 559.1, 559.2
See application file for complete search history.

(56) References Cited

U.S. PATENT DOCUMENTS

| | | | |
|---|---|---|---|
| 2002/0004696 A1* | 1/2002 | Rekewitz | F01L 1/34 701/103 |
| 2004/0237510 A1* | 12/2004 | Kusada | B60K 6/485 60/285 |
| 2005/0097888 A1 | 5/2005 | Miyashita | |
| 2006/0016431 A1* | 1/2006 | Mashiki | F02D 35/027 123/431 |
| 2007/0119420 A1* | 5/2007 | Leone | F01N 11/00 123/431 |
| 2007/0215102 A1 | 9/2007 | Russell et al. | |
| 2008/0077304 A1 | 3/2008 | Suzuki et al. | |
| 2009/0070014 A1 | 3/2009 | Miyashita | |
| 2009/0099756 A1* | 4/2009 | Demura | F02D 41/064 701/103 |
| 2011/0005491 A1* | 1/2011 | Terada | F02D 35/026 123/299 |
| 2012/0216774 A1* | 8/2012 | Oba | F02M 41/00 123/305 |

FOREIGN PATENT DOCUMENTS

| | | |
|---|---|---|
| JP | 3-185242 A | 8/1991 |
| JP | 11-229915 A | 8/1999 |
| JP | 2002-266686 A | 9/2002 |
| JP | 2005-133632 A | 5/2005 |
| JP | 2005-201113 A | 7/2005 |
| JP | 2006-322335 A | 11/2006 |
| JP | 2008-101540 A | 5/2008 |

* cited by examiner

CONTROL UNIT FOR INTERNAL COMBUSTION ENGINE

FIELD

The present invention relates to a control unit for an internal combustion engine including a direct injection valve (cylinder injection valve) directly injecting fuel into a cylinder and a port injection valve injecting fuel into an intake port of the cylinder.

BACKGROUND

Some conventional engines (internal combustion engines) have two parallel modes of cylinder injection (direct injection (DI)) and port injection. The engines achieve homogeneous combustion in the cylinder having a uniform concentration distribution of air-fuel mixture therein, and stratified combustion in the cylinder containing a dense air-fuel mixture concentrated around a spark plug in a layered form.

The typical fuel injection control mainly involves the port injection during the homogeneous combustion, and the direct injection during the stratified combustion. The selection of an appropriate fuel injection mode depending on the operating state of an engine and the load thereon can improve the fuel economy while maintaining the output of the engine and combustion stability.

In some of the engines, the period of opening of the intake valve overlaps with that of the exhaust valve to improve the efficiency of scavenging the exhaust air from the cylinder and the efficiency of air intake. In particular, an engine including a turbocharger in its intake and exhaust system can improve in the charging efficiency and engine output by increasing the valve overlap (overlap period). This prompts the development of techniques to vary the timings of opening and closure of the intake and exhaust valves of the engine, to control the valve overlap in response to parameters such as the engine load.

The increased valve overlap, however, causes blow-by more often, which means that the intake air introduced from the intake path directly flows into the exhaust path. Then, the engine in the port injection mode, which injects the fuel into the intake system, makes a flow of the fuel passing through the cylinder to the exhaust path. This phenomenon may impair the engine output and environmental performance.

To solve the above problem, techniques have been disclosed for preventing the blow-by of fuel by regulating the volume of fuel of the port injection. For example, Patent Literature 1 discloses a control to determine whether the current operating state causes blow-by of fuel and inhibit the port injection in response to the results of determination. The determination depends on the intake pressure, the exhaust pressure, and the number of revolutions of the engine (the engine speed). The control based on such determination can regulate blow-by of fuel caused by the valve overlap.

RELATED ART

Patent Literature

Patent Literature 1: Japanese Patent Application Publication No. 2005-133632

SUMMARY

Technical Problems

Unfortunately, the control disclosed in Patent Literature 1 inhibits port injection; hence, the fuel supply relies only on the direct injection in an operating state that causes blow-by of fuel. Thus, this control is inapplicable and cannot prevent the blow-by of fuel in an operating state involving the homogeneous combustion.

Furthermore, the regulation of the port injection is not always available under restriction on engine control. For example, the volume of fuel of the direct injection sometimes decreases during the parallel execution of the direct injection and port injection. In specific, the volume of fuel of the direct injection, which varies depending on the fuel pressure, decreases if the fuel pressure declines for some reasons. The fuel injection volume also decreases due to deposits accumulated around the exit of the direct injection valve (around the nozzle hole). Although an increase in the control command value for the fuel injection volume can ensure the actual volume of injection in general, the injection period is limited and thus does not lead to an increase in the actual volume of injection in some cases.

When the volume of fuel of the direct injection decreases for the above reasons, the decrement in the injection volume needs to be recovered by the port injection. This requires an increase in the port injection, which works against the regulation of blow-by of fuel.

An object of the present invention, which has been accomplished in view of the above problems, is to provide a control unit for an internal combustion engine for regulating blow-by of fuel and thus improving the engine output and environmental performance.

Another object of the present invention is to provide advantageous effects that are derived from the individual features described in the Description of Embodiment below but not from conventional techniques.

Solution to Problems (1) A control unit according to the present disclosure is designed for an internal combustion engine including a direct injector (direct injection valve) directly injecting fuel into a cylinder, and a port injector (port injection valve) injecting fuel into an intake port of the cylinder.

The control unit includes an injection volume calculator to calculate a direct injection volume indicating a volume of the fuel injected from the direct injector, a port injection controller to control a port injection volume indicating a volume of a fuel injected from the port injector, an overlap period controller to control an overlap period during which both an intake valve and an exhaust valve of the cylinder are open, and a changer to vary both the port injection volume and the overlap period based on the direct injection volume.

(2) In a preferred embodiment, when the direct injection volume decreases, the changer increases the port injection volume equivalent to a decrement in the direct injection volume and reduces the overlap period.

(3) In a preferred embodiment, as the port injection volume increases, the changer reduces the overlap period.

(4) In a preferred embodiment, the control unit further includes a turbocharge detector to detect a running state of a turbocharger of the engine. In this case, if the turbocharge detector detects the running of the turbocharger, the changer varies both the port injection volume and the overlap period.

(5) In a preferred embodiment, as the number of revolutions of the engine decreases, the changer reduces the overlap period.

(6) In a preferred embodiment, the changer delays opening of the port injector upon a reduction in the direct injection volume.

(7) In a preferred embodiment, as the number of revolutions of the engine decreases, the changer increases a lag in the opening of the port injector.

Advantageous Effects

The control unit for an internal combustion engine according to the present disclosure can prevent the blow-by of fuel of port injection to the exhaust port in an operating state that readily causes the blow-by, and can improve the output and environment performance of the engine. The control unit does not vary the valve overlap period in the non-turbocharge operation, which scarcely causes blow-by of fuel of port injection, thereby optimizing the charging efficiency and combustion efficiency of the engine.

DESCRIPTION OF EMBODIMENTS

The control unit will now be described with reference to the accompanying drawings. The embodiments below are mere examples and do not intend to exclude application of various modifications or techniques that are not described in the embodiments. The individual features of the embodiments may be variously modified within the gist thereof, and may be selectively employed as necessary or properly combined with one another.

[1. Structure of Device]

[1-1. Engine]

Figure 1:
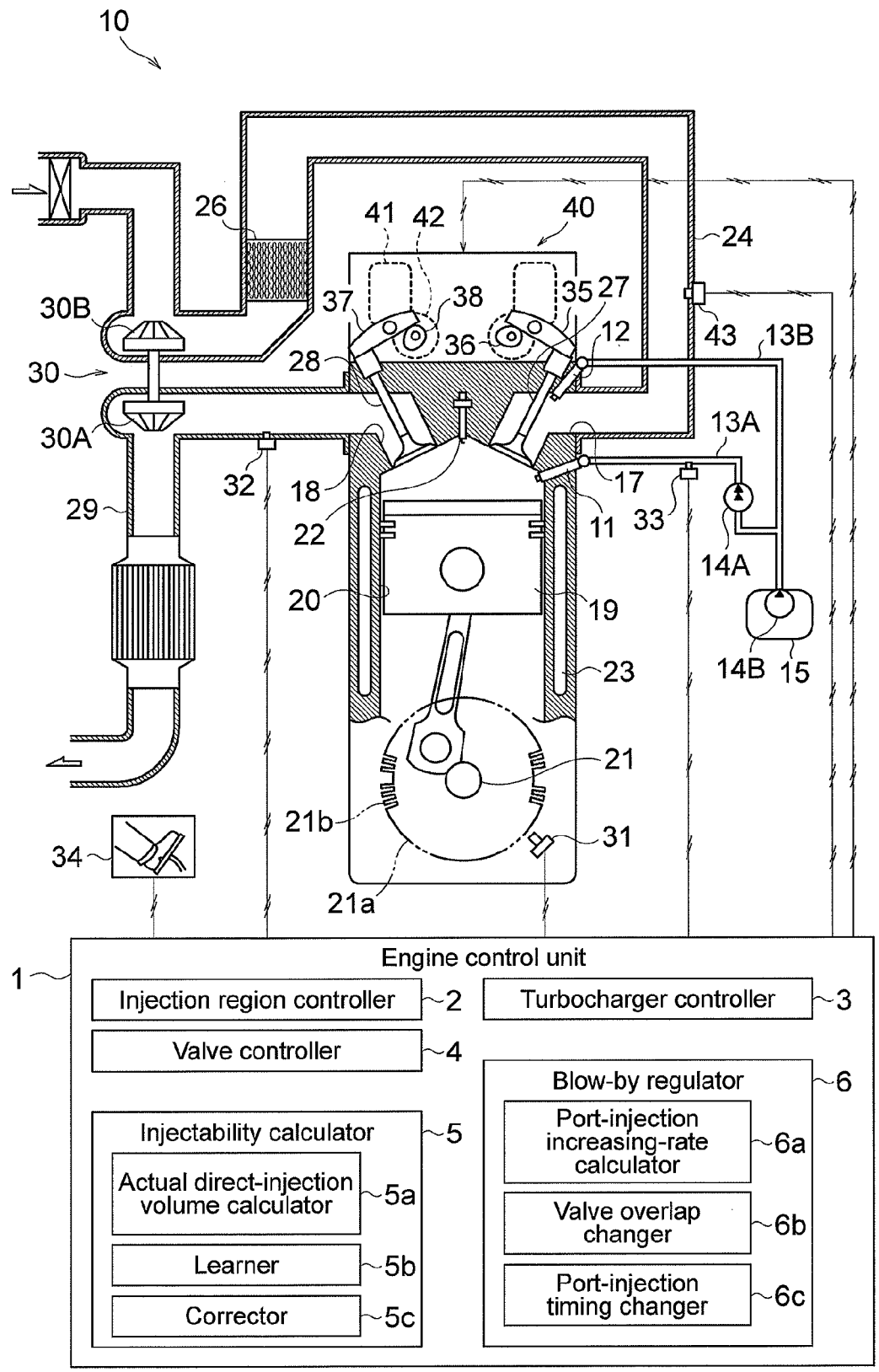
FIG. 1 is a diagram illustrating the block configuration of a control unit for an internal combustion engine according to one embodiment and the structure of an engine to which the control unit is applied.

A control unit for an internal combustion engine according to the present embodiment is applied to an in-vehicle gasoline engine 10 (hereinafter referred to as "engine 10") illustrated in FIG. 1. The figure illustrates a cylinder 20, which is one of the cylinders provided in the multi-cylinder engine 10. A piston 19 reciprocating in the cylinder 20 is connected to a crankshaft 21 via a connecting rod.

There is a water jacket 23 around the cylinder 20 for cooling water flowing therethrough. The water jacket 23 leads to a cooling water path (not shown), so that cooling water circulates in the water jacket 23 and the cooling water path.

The ceiling of the cylinder 20 is connected with an intake port 17 and an exhaust port 18. The opening of the intake port 17 adjacent to the cylinder 20 includes an intake valve 27, while the exhaust port 18 includes an exhaust valve 28. The intake valve 27 opens or closes to connect or disconnect the intake port 17 to a combustion chamber (the inside of the cylinder 20), while the exhaust valve 28 opens or closes to connect or disconnect the exhaust port 18 from the combustion chamber.

Between the intake port 17 and exhaust port 18, a spark plug 22 is mounted such that its tip protrudes into the combustion chamber. The spark plug 22 sparks off at an ignition timing controlled by an engine control unit 1 described below.

The tops of the intake valve 27 and exhaust valve 28 are respectively connected to the rocker arms 35 and 37 in a variable valve mechanism 40, and independently reciprocate in the vertical direction in response to swings of the rocker arms 35 and 37. The other ends of the rocker arms 35 and 37 are provided with cams 36 and 38 rotatably supported by camshafts. The shapes (cam profiles) of the cams 36 and 38 define the swing patterns of the rocker arms 35 and 37. The valve lifts and valve timings of the intake valve 27 and exhaust valve 28 are controlled by the engine control unit 1 via the variable valve mechanism 40.

[1-2. Fuel Injection System]

To supply fuel to the cylinder 20, a direct injector 11 (cylinder injection valve) injecting fuel directly into the cylinder 20 and a port injector 12 (port injection valve) injecting fuel into the intake port 17 are provided. The fuel from the direct injector 11 is introduced to the vicinity of the spark plug 22 by the internal laminar airflow, for example, and inhomogeneously distributed in the intake air. In contrast, the fuel from the port injector 12 is atomized in the intake port 17, for example, and well mixed with the intake air and enters the cylinder 20.

The two injectors are also provided to each of the other cylinders (not shown) of the engine 10. The volumes and timings of the fuel injection from the direct injector 11 and port injector 12 are controlled by the engine control unit 1. For example, the engine control unit 1 transmits control pulse signals to the injector 11 or 12, which cause the exit of the injector 11 or 12 to open for a period corresponding to the magnitude of the signals. The fuel injection volume therefore reflects the magnitude of control pulse signals (driving pulse width) and the injection timing reflects the time of transmission of control pulse signals.

The direct injector 11 is connected to a high-pressure pump 14A via a high-pressure fuel path 13A, while the port injector 12 is connected to a low-pressure pump 14B via a low-pressure fuel path 13B. The direct injector 11 is supplied with fuel at a higher pressure than that of the port injector 12.

The high-pressure pump 14A and low-pressure pump 14B are mechanical pumps with variable flow rates for pumping fuel. The pumps 14A and 14B are driven by a component such as the engine 10 or a motor, and pump fuel from a fuel tank 15 into the paths 13A and 13B, respectively. The volumes and pressures of the fuel from the pumps 14A and 14B are variably controlled by the engine control unit 1.

[1-3. Valve System]

The engine 10 includes the variable valve mechanism 40 controlling operations of the rocker arms 35 and 37 or the cams 36 and 38. The variable valve mechanism 40 varies the maximum valve lifts and valve timings of the intake valve 27 and exhaust valve 28 independently or in cooperation with each other. The variable valve mechanism 40 includes valve lift adjusters 41 and valve timing adjusters 42 for varying the widths and timings of swings of the rocker arms 35 and 37.

The valve lift adjusters 41 continuously vary the maximum valve lifts of the intake valve 27 and exhaust valve 28, and can vary the widths of swings transferred from the cams 36 and 38 to the rocker arms 35 and 37. The valve lift adjusters 41 may have any specific structure to vary the swing widths of the rocker arms 35 and 37.

The control parameter corresponding to the valve lift is a control angle $\theta_{VVL}$. The valve lift adjusters 41 increase the valve lift as the control angle $\theta_{VVL}$ increases. The control angle $\theta_{VVL}$ is calculated by a valve controller 4 of the engine control unit 1 and transmitted to the valve lift adjusters 41.

The valve timing adjusters 42 vary the timings of opening and closure (valve timings) of the intake valve 27 and exhaust valve 28, and can vary the rotational phases of the cams 36 and 38 or the camshafts, which cause the rocker arms 35 and 37 to swing. A change in the rotational phase of the cam 36 or 38 or the camshaft results in continuous shifts in swing timings of the rocker arm 35 or 37 relative to the rotational phase of the crankshaft 21.

The control parameter corresponding to the valve timing is a phase angle $\theta_{VVT}$. The phase angle $\theta_{VVT}$ indicates how much the phase of the cam 36 or 38 gets advanced or retarded relative to the reference phase of the camshaft. The phase angle $\theta_{VVT}$ corresponds to the opening timing and closing timing of the intake valve 27 or exhaust valve 28, respectively. The phase angle $\theta_{VVT}$ is calculated by the valve controller 4 of the engine control unit 1 and transmitted to the valve timing adjusters 42. The valve timing adjusters 42 properly control the valve timings by adjusting the phase angles $\theta_{VVT}$ of the cams 36 and 38.

[1-4. Intake and Exhaust System]

The intake and exhaust system of the engine 10 further includes a turbocharger 30 turbocharging the cylinder 20 with intake air by the action of the exhaust pressure. The turbocharger 30 is mounted across both the intake path 24 connected to the upstream side of the intake port 17 and the exhaust path 29 connected to the downstream side of the exhaust port 18.

The turbocharger 30 includes a turbine 30A and a compressor 30B. The turbine 30A rotates by the action of the exhaust pressure in the exhaust path 29 and transmits the rotation to the compressor 30B in the intake path 24. The compressor 30B compresses the intake air in the intake path 24 toward the downstream and turbocharges the engine 10. The intake path 24 includes an intercooler 26 at the downstream side of the compressor 30B for cooling the compressed air. The engine control unit 1 controls the turbocharging operation by the turbocharger 30.

[1-5. Detection System]

The crankshaft 21 includes a crank disk 21a provided coaxially with the rotational axis of the crankshaft 21, and a crank angle sensor 31 detecting the rotation angle of the crank disk 21a, at one end of the crankshaft 21. The edge of the crank disk 21a has irregularities 21b, for example. The crank angle sensor 31, which is fixed near the edge of the crank disk 21a, detects the profile of the irregularities 21b of the crank disk 21a and outputs crank pulse signals. The output crank pulse signals are transmitted to the engine control unit 1.

As the rotational rate of the crankshaft 21 increases, the period of the crank pulse signals output from the crank angle sensor 31 decreases. The time density of the crank pulse signals reflects the actual number Ne of revolutions of the engine (rotational frequency of the engine, engine speed) and an angular velocity of the crankshaft 21. Thus, the crank angle sensor 31 detects the number Ne of engine revolutions, the crank angle, and the angular velocity.

The exhaust path 29 includes an oxygen level sensor 32 at any location for measuring an oxygen level in the exhaust air. The information on the detected oxygen level is transmitted to the engine control unit 1.

The intake path 24 includes an airflow sensor 43 detecting the airflow rate. The information on the detected airflow rate, which corresponds to the volume of intake air to enter the cylinder 20, is transmitted to the engine control unit 1.

The high-pressure fuel path 13A includes a fuel pressure sensor 33 detecting a pressure of fuel to enter the direct injector 11. The information on the detected fuel pressure is also transmitted to the engine control unit 1.

The vehicle includes an accelerator pedal sensor 34 at any location for detecting a manipulated variable corresponding to a pressing depth on the accelerator pedal. The manipulated variable on pressing on the accelerator pedal reflects a driver's request for acceleration, that is, an output request to the engine 10. The information on the detected manipulated variable is transmitted to the engine control unit 1.

[1-6. Control System]

The vehicle is provided with the engine control unit 1 (engine ECU) as an electronic control unit. The engine control unit 1 includes, for example, an LSI device (Large Scale Integrated circuit) or an embedded electronic device into which a microprocessor, a ROM (Read Only Memory), and a RAM (Random Access Memory) are integrated. The engine control unit 1 is connected with other electronic control units, the variable valve mechanism 40, and several sensors such as the crank angle sensor 31, the oxygen level sensor 32, the fuel pressure sensor 33, and the accelerator pedal sensor 34 via their dedicated communication lines or an in-vehicle communication network.

The engine control unit 1 controls various systems for the engine 10, such as an ignition system, a fuel injection system, an intake and exhaust system, and a valve system. Specific targets to be controlled by the engine control unit 1 include the volumes and timings of fuel injection from the direct injector 11 and port injector 12, the ignition timing of the spark plug 22, the valve lifts and valve timings of the intake valve 27 and exhaust valve 28, the running state of the turbocharger 30, and the opening of a throttle valve (not shown).

Four control operations in the present embodiment will now be described in detail: an "injection region control" to control the total fuel injection volume by overall management of the fuel injection from both the direct injector 11 and port injector 12; "turbocharge control" to control the running state of the turbocharger 30; "injectability calculation control" to determine a decline in the fuel injectability of the direct injector 11; and "blow-by regulating control" to prevent fuel from flowing to the exhaust path 29 during valve overlap.

[2. Summary of Control]

[2-1. Injection Region Control]

The injection region control serves to select an appropriate fuel injection mode depending on the operating state of the engine 10 and the output required for the engine 10. In the present embodiment, either a port injection mode involving only the port injection or a direct-injection priority mode preferentially involving the direct injection is selected on the basis of the number Ne of engine revolutions, engine load, air volume, and charging efficiency Ec (e.g., target charging efficiency and actual charging efficiency), for example.

The charging efficiency Ec is the air volume to be charged in the cylinder 20 during a single intake stroke (during which the piston 19 travels from the top dead center to the bottom dead center), the air volume being normalized into a volume under the standard conditions and then being divided by the cylinder capacity. The actual charging efficiency corresponds to the air volume that has entered the cylinder 20 during the stroke, while the target charging efficiency is a desirable value of the charging efficiency Ec and corresponds to the desirable air volume.

The port injection mode is selected during a low-load low-revolution operating state of the engine 10. The port injection mode inhibits fuel injection from the direct injector 11 and allows the port injector 12 to supply all the fuel necessary to obtain the required output. The fuel volume supplied from the port injector 12 is hereinafter referred to as "port injection volume."

The direct-injection priority mode is selected when the engine 10 is not in a low-load low-revolution operating state (when the port injection mode is inactivated). The direct-injection priority mode prioritizes the direct injection over the port injection. In other words, as long as the direct injector 11 can supply all the fuel necessary for the required output, the direct injector 11 is solely used for fuel injection. The fuel volume supplied from the direct injector 11 is hereinafter referred to as "direct injection volume."

The direct injector 11 however has a maximum injection volume due to the limited injection period and cannot supply more fuel than the maximum volume in a single combustion cycle. Accordingly, if the desirable volume of direct injection exceeds the maximum injection volume of the direct injector 11, the shortfall is recovered by the port injector 12 to ensure the total fuel injection volume. In this case, the direct injector 11 and port injector 12 are activated in the same combustion cycle for both the direct injection and port injection.

[2-2. Turbocharge Control]

The turbocharge control sets a running state (e.g., on/off state and running intensity) of the turbocharger 30 depending on an operating state and a required output of the engine 10. In the present embodiment, the control determines whether to run the turbocharger 30 based on the number Ne of engine revolutions and a load on the engine 10, for example, and drives the turbocharger 30 in response to the result of determination.

As a typical method of controlling a turbocharger, the turbocharger 30 is driven when the required load on the engine 10 exceeds a predetermined load. The turbocharge increases intake air to enter the cylinder 20 and increases the engine output.

[2-3. Injectability Calculation Control]

The tip of the direct injector 11 is always exposed to the combustion gas in the cylinder 20, and deposits may be adhered and accumulated around the exit. An increased amount of deposit causes the actual volume of injection from the direct injector 11 to fall below the desirable fuel injection volume designated by the control pulse signals. The injectability calculation control calculates (determines or estimates) such a decline in the fuel injectability of the direct injector 11, and feedbacks the decline to the control command value, thereby ensuring the necessary fuel injection volume. The actual volume of injection from the direct injector 11 is calculated based on the oxygen level in the exhaust air detected by the oxygen level sensor 32, for example.

If the fuel injectability of the direct injector 11 decreases, the injectability calculation control adds the volume of a fuel shortfall caused by the capability decline to the desirable fuel injection volume to ensure the sufficient actual fuel injection volume. The information on the fuel volume added to compensate for the capability decline is stored to be learned for the direct injector 11 provided to each of the cylinders 20. If the desirable fuel injection volume after the compensation for the injectability decline exceeds the maximum injection volume of the direct injector 11, the volume to be compensated is added to the volume of fuel injection from the port injector 12. This control operation can ensure the total fuel injection volume even if the injectability of the direct injector 11 decreases.

[2-4. Blow-By Regulating Control]

The blow-by regulating control prevents the fuel supplied by port injection from passing through the cylinder 20 to the exhaust path 29 during the turbocharge operation. The blow-by regulating control starts, for example, if the injectability decline in the direct injector 11 determined by the injectability calculation control exceeds a reference value during the running of the turbocharger 30 under the turbocharge control.

The blow-by regulating control contains three specific modes:

(1) to calculate an increasing rate of the port injection volume to compensate for a decline in the direct injection volume;

(2) to reduce the valve overlap period in response to the increasing rate of the port injection volume; and (3) to delay the port injection timing.

The blow-by regulating control reduces the valve overlap period across an exhaust stroke and an intake stroke, thereby decreasing the volume of the air-fuel mixture flowing from the intake port 17 to the exhaust port 18. The volume of blow-by air-fuel mixture further decreases if the valve overlap period reduces in response to the increasing rate of the port injection volume (in response to the decreasing rate of the direct injection volume). Delaying the port injection timing reduces the period from the start of fuel injection to the closure of the exhaust valve 28, further decreasing the blow-by air-fuel mixture.

[3. Configuration of Control]

The engine control unit 1 for achieving the above control operations includes an injection region controller 2, a turbocharge controller 3, a valve controller 4, an injectability calculator 5, and a blow-by regulator 6 in the form of software or hardware.

The input interface of the engine control unit 1 is connected with the crank angle sensor 31, the oxygen level sensor 32, the fuel pressure sensor 33, and the accelerator pedal sensor 34, and receives the rotation angle (or the number Ne of engine revolutions calculated based on the rotation angle), the oxygen level in exhaust air, the fuel pressure, and the manipulated variable on pressing on the accelerator pedal, respectively. The output interface of the engine control unit 1 is connected with the direct injector 11, the port injector 12, and the variable valve mechanism 40.

Figure 2:
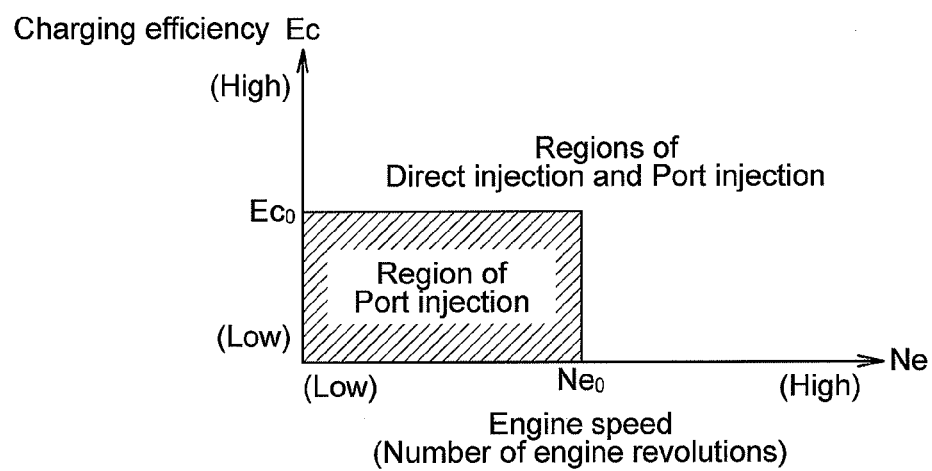
FIG. 2 is a graph for explaining regions of the direct injection and port injection by the control unit.

The injection region controller 2 (port injection controller) for the injection region control retains the preset correspondence relationship between the operating state of the engine 10 and the injection mode. For example, as illustrated in FIG. 2, if the number Ne of engine revolutions is smaller than a predetermined number $Ne_0$ and if the charging efficiency Ec is smaller than a predetermined charging efficiency $Ec_0$, the port injection mode is selected. In any other operating state, the direct-injection priority mode is selected.

The value of the charging efficiency Ec may be, for example, an actual charging efficiency (actual intake volume) calculated based on the airflow rate detected by the airflow sensor 43, or a target charging efficiency (target intake volume) calculated based on the manipulated variable on pressing on the accelerator pedal and the number Ne of engine revolutions.

If the port injection mode is selected, the injection region controller 2 outputs control pulse signals to the port injector 12 for sole execution of the port injection. In contrast, if the direct-injection priority mode is selected, the injection region controller 2 outputs control pulse signals to the direct injector 11, and also outputs control pulse signals to the port injector 12 as required. Thus, the injection region controller 2 serves as a port injection controller controlling the volume of port injection from the port injector 12.

The magnitude of the control pulse signals (driving pulse width) output to the direct injector 11 is set to correspond to the desirable volume of direct injection calculated based on the number Ne of engine revolutions and charging efficiency Ec. The desirable volume of direct injection however has an upper limit due to the maximum injection volume of the direct injector 11.

The magnitude of the control pulse signals output to the port injector 12 is set to correspond to a value calculated by subtracting the maximum injection volume of the direct injector 11 from the desirable volume of direct injection. If the desirable volume of direct injection from the direct injector 11 is equal to or smaller than the maximum injection volume thereof, the control pulse signals for the port injector 12 are not output. Such settings of control pulse signals lead to preferential driving of the direct injector 11.

The turbocharge controller 3 (turbocharge detector) for the turbocharge control determines the number Ne of engine revolutions and the magnitude of load on the engine 10, and outputs control signals for driving the turbocharger 30 if the current operating state needs turbocharge.

The load magnitude may be calculated based on the manipulated variable on pressing on the accelerator pedal, the opening of the throttle valve, or the air volume (e.g., target intake volume, target charging efficiency, actual intake volume, and actual charging efficiency). The conditions required for turbocharge may be independent from the conditions required for selecting an injection mode, or may be defined as a certain region of the graph of FIG. 2.

The valve controller 4 (overlap period controller) for controlling operations of the variable valve mechanism 40 determines the control angle $\theta_{VVL}$ and phase angle $\theta_{VVT}$ of each of the intake valve 27 and exhaust valve 28 in response to parameters such as the operating state of the engine 10, the number Ne of engine revolutions, and the engine load. The information on the control angles $\theta_{VVL}$ and phase angles $\theta_{VVT}$ is transmitted from the valve controller 4 to the valve lift adjusters 41 and valve timing adjusters 42 of the variable valve mechanism 40.

The injectability calculator 5 (injection volume calculator) for injectability calculation control includes an actual direct-injection volume calculator 5a, a learner 5b, and a corrector 5c.

The actual direct-injection volume calculator 5a calculates an actual volume of direct injection based on the oxygen level in exhaust air detected by the oxygen level sensor 32. The actual direct-injection volume calculator 5a estimates the amount of oxygen consumed by the combustion on the basis of a difference between the oxygen level in exhaust air and the external oxygen level, and calculates the consumed fuel volume corresponding to the amount of consumed oxygen.

In parallel execution of the direct injection and port injection, the actual volume of direct injection from the direct injector 11 is calculated by subtracting the volume of fuel of the port injection from the calculated volume of the consumed fuel. In sole execution of the direct injection, the actual volume of the direct injection is equal to the calculated volume of the consumed fuel. The calculated actual volume of direct injection is transmitted to the learner 5b.

The learner 5b calculates a decrement in the actual volume of the direct injection calculated by the actual direct-injection volume calculator 5a relative to the desirable volume of the direct injection, which is corresponding to the control pulse signals output from the injection region controller 2. The learner 5b calculates a shortfall in the volume of the direct injection and a decrement in the injectability for the direct injector 11 provided to each of the cylinders 20. The decrement in the injectability can be comprehended, for example, by calculating the rate of the actual volume of the direct injection to the desirable volume of the direct injection. The decrement can be comprehended by calculating the amount of the deposit estimated based on the shortfall in the volume of the direct injection. The shortfall in the volume of the direct injection is transmitted to the corrector 5c, while the decrement in the injectability is stored in a storage memory in the learner 5b.

The corrector 5c allows the injection region controller 2 to output the control pulse signals after compensation for the shortfall in the volume of the direct injection. The corrector 5c outputs control signals for adding the shortfall in the volume of the direct injection to the volume of the direct injection from the direct injector 11 calculated by the injection region controller 2. Thus, if the learner 5b detects an injectability decline in the direct injector 11, the volume of the direct injection in the subsequent injections is corrected to increase. If the corrected volume of the direct injection from the direct injector 11 exceeds the maximum injection volume thereof, the volume of the port injection is corrected to increase.

The blow-by regulator 6 (changer) for the blow-by regulating control achieves the above-explained three control modes under conditions required to start the blow-by regulating control. One of the required conditions is the need of turbocharge in the current operating state determined by the turbocharge controller 3, and another one is a decrement in the injectability of the direct injector 11 calculated by the learner 5b exceeding a reference value (the deposits are so accumulated that the injectability falls below a reference value). If these two conditions are satisfied, the blow-by regulator 6 performs the three control modes. For the three individual control modes, the blow-by regulator 6 includes a port-injection increasing-rate calculator 6a, a valve overlap changer 6b, and a port-injection timing changer 6c.

The port-injection increasing-rate calculator 6a calculates an increasing rate of the volume of port injection from the port injector 12. When the corrector 5c corrects the port injection volume to increase, the increasing rate is equal to the rate of the increment to the port injection volume before the correction. The information on the increasing rate is transmitted to the valve overlap changer 6b.

The valve overlap changer 6b reduces the period of valve overlap (VOL) in response to the increasing rate of the port injection volume. The decrement in the valve overlap period is determined in response to the increasing rate calculated by the port-injection increasing-rate calculator 6a and the number Ne of engine revolutions. The "VOL Limitation Map" in Table 1 below shows an example of the determined decrements. According to the example, as the increasing rate of the port injection volume increases or as the number Ne of engine revolutions decreases, the decrement in the valve overlap period increases (the valve overlap period decreases).

TABLE 1

VOL LIMITATION MAP (DECREMENT IN VOL RELATIVE TO SET VALUE)

| | | NUMBER OF ENGINE REVOLUTIONS [rpm] | | | |
|---|---|---|---|---|---|
| | | 1000 | 2000 | 3000 | ... |
| INCREASING RATE OF PORT INJECTION VOLUME [%] | 5 | 15[°CA] | 10[°CA] | 5[°CA] | ... |
| | 10 | 20[°CA] | 15[°CA] | 10[°CA] | ... |
| | 15 | 25[°CA] | 20[°CA] | 15[°CA] | ... |
| | ... | ... | ... | ... | ... |

The port-injection timing changer 6c delays the timing of fuel injection from the port injector 12. The lag (retarded time, retarded angle) for the port injection timing is determined in response to the number Ne of engine revolutions. The "Port Injection Timing Map" in Table 2 below shows an example of the determined lags. According to the example, as the number Ne of engine revolutions decreases, start of the port injection lags (start time of the port injection is delays). The figures in the table each indicate what degree the crank angle upon start of the port injection lags relative to the reference angle (0 [° CA]) at the top dead center after a compression stroke. ("BTDC" represents "Before the Top Dead Center".)

TABLE 2

PORT INJECTION TIMING MAP
NUMBER OF ENGINE REVOLUTIONS [rpm]

| 1000 | 2000 | 3000 | ... |
|---|---|---|---|
| 450[°CA, BTDC] | 500[°CA, BTDC] | 545[°CA, BTDC] | ... |

[4. Flowchart]

Figure 3:
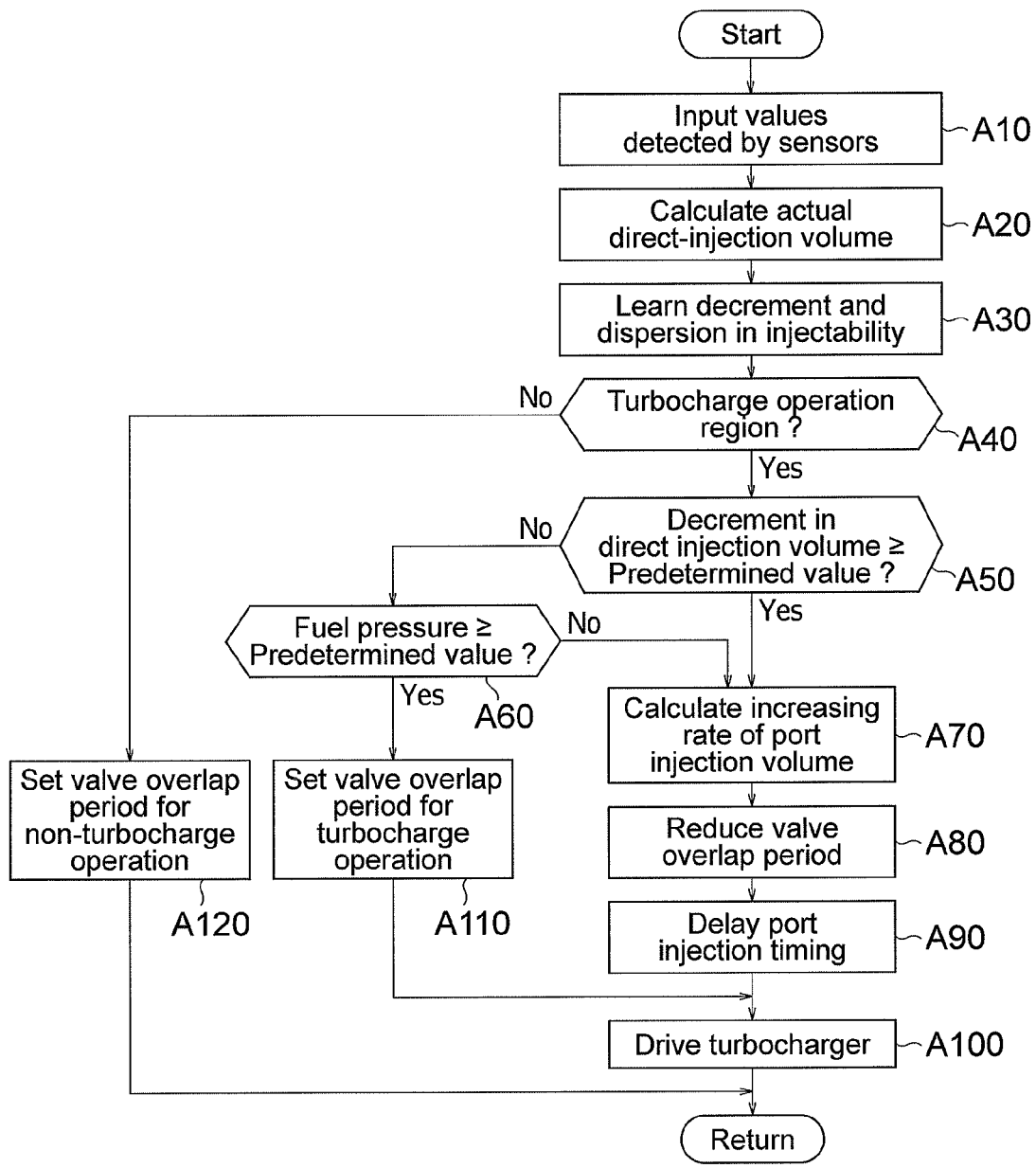
FIG. 3 is a flowchart illustrating control operations by the control unit.

FIG. 3 illustrates a flowchart regarding the blow-by regulating control among the control operations in the engine control unit 1. The following explanation involves the process of the blow-by regulating control after direct injection in the direct-injection priority mode.

In Step A10, the engine control unit 1 receives information such as the oxygen level in exhaust air, the pressure of fuel to enter the direct injector 11, and the desirable volume of the direct injection. In Step A20, the injectability calculator 5 calculates the volume of the consumed fuel based on the oxygen level in exhaust air, and calculates the actual volume of direct injection from the direct injector 11.

In Step A30, the learner 5b calculates a decrement in the actual volume of the direct injection relative to the desirable volume of the direct injection, and calculates the shortfall in the direct injection volume. The storage of the learner 5b stores to learn the calculated decrement in the injectability for the direct injector 11 of each of the cylinders 20. The learning contributes to the direct injection in the subsequent calculation periods.

In Step A40, the turbocharge controller 3 determines whether the turbocharge operation is performed. If the turbocharge operation is performed, the process goes to Step A50. If the turbocharge operation is not performed, the process goes to Step A120 to set the valve overlap period for non-turbocharge operation and to be terminated. In this case, the normal valve overlap setting is adopted under the presumption that the non-turbocharge operation does not cause blow-by of fuel.

In Step A50, whether the decrement in the actual volume of the direct injection calculated in Step A30 exceeds a predetermined value is determined. For an engine 10 including multiple cylinders, the fluctuation in the volumes of fuel injection from the individual direct injectors 11 of the cylinders 20 may be determined in this step. For example, whether the deviation of the decrement for each of the direct injectors 11 exceeds a predetermined value may be determined.

If the condition is satisfied in Step A50, which means that accumulation of the deposits causes the injectability of the direct injector 11 to fall below a reference value, the process goes to Step A70. If the condition is not satisfied in Step A50, the process goes to Step A60.

In Step A60, whether the pressure of fuel to enter the direct injector 11 exceeds a predetermined value is determined. The injectability decline in the direct injector 11 may be caused by, for example, any trouble in the high-pressure fuel path 13A or the high-pressure pump 14A. In this step, the determination on the normality of the fuel pressure leads to no injectability decline caused by troubles in the fuel injection system.

If the fuel pressure is the predetermined value or higher, which means that the injectability of the direct injector 11 has not significantly deteriorated, the process goes to Step A110. In Step A110, the normal valve overlap period for turbocharge operation is set, and the process goes to Step A100. In contrast, if the fuel pressure is lower than the predetermined value, the process goes to Step A70.

In Step A70, the port-injection increasing-rate calculator 6a calculates an increasing rate of the volume of port injection from the port injector 12. For example, the port-injection increasing-rate calculator 6a calculates an increment in the port injection volume based on the decrement in the actual volume of the direct injection calculated in Step A50 and the fuel pressure, and calculates the increasing rate in the form of the rate of the increment to the port injection volume before the correction.

In Step A80, the valve overlap changer 6b determines a decrement in the valve overlap period based on the increasing rate of the port injection volume and the number Ne of engine revolutions. As the increasing rate of the port injection volume increases o r as the number Ne of engine revolutions decreases, the valve overlap period decreases. The decrement in the valve overlap period is transmitted to the valve controller 4, which controls the phase angles $\theta_{VVT}$ of the intake valve 27 and exhaust valve 28 in response to the decrement. The phase angles $\theta_{VVT}$ may be controlled by any method. For example, the opening of the intake valve 27 may lag, or the closure of the exhaust valve 28 may advance.

In Step A90, the port-injection timing changer 6c determines the timing of start of the port injection based on the number Ne of engine revolutions. As the number Ne of engine revolutions decreases, the start timing of the port injection lags. In Step A100, the turbocharge controller 3 outputs control signals to the turbocharger 30 for turbocharge.

The information on the decrement in the direct injection volume stored in the learner 5b in the above-explained control, the increment in the port injection volume, and the port injection timing is reflected in the control pulse signals transmitted to the direct injector 11 and port injector 12.

[5. Operations and Advantageous Effects]

The above-described embodiments can provide the following operations and advantageous effects:

(1) The engine control unit 1 varies both the port injection volume and valve overlap period based on both the running state of the turbocharger 30 and the injectability of the direct injector 11. This control operation can prevent blow-by of fuel of port injection to the exhaust port in an operating state that readily causes the blow-by, and can improve the exhaust performance while maintaining the output from the engine 10. The engine control unit 1 does not vary the valve overlap period in the non-turbocharge operation, which barely causes blow-by of fuel of port injection. This mode can thus optimize the charging efficiency and combustion efficiency.

(2) The engine control unit 1 increases the port injection volume equivalent to the decrement in the direct injection volume, thereby achieving the constant total fuel injection volume and maintaining the engine output. The engine control unit 1 also reduces the valve overlap period, thereby preventing the blow-by caused by the increased port injection volume. The engine 10 can therefore efficiently operate while maintaining both the engine output and exhaust performance.

(3) As the port injection volume increases, the engine control unit 1 reduces the valve overlap period, as illustrated in Table 1. In other words, the decrement in the valve overlap period reflects the increasing rate of the port injection volume. This control operation can enhance the effect of regulating the blow-by of fuel.

(4) As the number Ne of engine revolutions decreases, the engine control unit 1 reduces the valve overlap period, as illustrated in Table 1. In other words, as the actual time of the valve overlap increases, the valve overlap period decreases. This control operation can further enhance the effect of regulating the blow-by of fuel.

(5) The engine control unit 1 delays the port injection timing, thereby reducing the period from the start of fuel injection into the intake port 17 to the closure of the exhaust valve 28. This control operation can further enhance the effect of regulating the blow-by of fuel.

(6) As the number Ne of revolutions of the engine decreases, the engine control unit 1 increases the lag in the opening of the port injector, as illustrated in Table 2. In other words, as the actual time from the start of fuel injection into the intake port 17 to the closure of the exhaust valve 28 increases in a lower-revolution operation, the opening of the port injector lags. This control operation can further enhance the effect of regulating the blow-by of fuel.

(7) Regarding the estimation of the injectability of the direct injector 11, the engine control unit 1 calculates how much the actual volume of direct injection has declined relative to the desirable volume of direct injection. The reference to the decrement in the actual injection volume relative to the control command value can eliminate the effect of calculation errors in the engine control unit 1. This control operation leads to accurate determination of the injectability decline.

(8) The engine control unit 1 calculates the actual volume of direct injection based on the oxygen level in exhaust air, thereby accurately estimating the amount of oxygen consumed by the combustion. This control operation can improve the accuracy of calculation for the actual volume of direct injection from the direct injector 11.

(9) The engine control unit 1 achieves the blow-by regulating control regardless of a small amount of accumulated deposit under a fuel pressure lower than a predetermined value. The reference to the fuel pressure leads to specifying the cause of decline in the direct injection volume, for example, determining whether the cause is the accumulation of deposits on the direct injector 11 or any trouble in the fuel injection system. This control operation leads to accurate detection of the decline in the direct injection volume.

[6. Modifications]

The above-described embodiments may be modified without departing from the gist thereof. The individual features of the embodiments may be selectively employed as necessary or properly combined with one another.

The conditions required to start the blow-by regulating control in the above explanation is the running of the turbocharger 30 under the turbocharge control, and the decline in the injectability of the direct injector 11 determined in the injectability calculation control to exceed a reference value. The blow-by regulating control however may start under any other specific condition, for example, if the current state readily causes blow-by of fuel of the port injection.

Although the above explanation describes the present invention applied to the multi-cylinder gasoline engine 10, the engine 10 may include any number of cylinders and employ any combustion system.

REFERENCE SIGNS LIST 1 engine control unit (control unit)
2 injection region controller (port injection controller)
3 turbocharge controller (turbocharge detector)
4 valve controller (overlap period controller)
5 injectability calculator (injection volume calculator)
5a actual direct-injection volume calculator
5b learner
5c corrector
6 blow-by regulator (changer)
6a port-injection increasing-rate calculator
6b valve overlap changer
6c port-injection timing changer
10 engine (internal combustion engine)
11 direct injector (direct injection valve)
12 port injector (port injection valve)

The invention claimed is:

1. A control unit for an internal combustion engine, the engine comprising a direct injector directly injecting fuel into a cylinder and a port injector injecting fuel into an intake port of the cylinder, the control unit comprising:
   an injection volume calculator to calculate an actual direct injection volume indicating a volume of the fuel injected from the direct injector;
   a port injection controller to control a port injection volume indicating a volume of the fuel injected from the port injector;
   an overlap period controller to control an overlap period during which both an intake valve and an exhaust valve of the cylinder are open; and
   a changer to vary both the port injection volume and the overlap period based on the actual direct injection volume, wherein
   the injection volume calculator calculates a shortfall value in a direct injection volume by subtracting the actual direct injection volume from a target direct injection volume, and determines whether the shortfall value exceeds a predetermined value, and
   when the shortfall value exceeds the predetermined value, the changer reduces the overlapped period as the port injection volume increases.

2. The control unit according to claim 1, wherein when the shortfall value exceeds the predetermined value because of accumulated deposits around an exit of the direct injector, the changer increases the port injection volume equivalent to the shortfall value and reduces the overlap period.

3. The control unit according to claim 2, wherein
when the shortfall value exceeds the predetermined value, the charger calculates an increasing rate of the port injection volume based on the shortfall value, and varies the overlap period based on the calculated increasing rate.

4. The control unit according to claim 1, further comprising:
a turbocharge detector to detect a running state of a turbocharger of the engine, wherein
if the turbocharge detector detects the running of the turbocharger, the changer varies both the port injection volume and the overlap period.

5. The control unit according to claim 1, wherein as the number of revolutions of the engine decreases, the changer reduces the overlap period.

6. The control unit according to claim 1, wherein the changer delays opening of the port injector upon a reduction in the actual direct injection volume.

7. The control unit according to claim 6, wherein as the number of revolutions of the engine decreases, the changer increases a lag in the opening of the port injector.

8. The control unit according to claim 3, wherein
the changer calculates the increasing rate based on the shortfall value and a pressure of fuel supplied to the direct injector.

9. The control unit according to claim 3, wherein
the changer varies the overlap period based on the calculated increasing rate and a rotation speed of the engine.

\* \* \* \* \*